United States Patent [19]
Amano

[11] Patent Number: 5,461,597
[45] Date of Patent: Oct. 24, 1995

[54] MASTERING APPARATUS FOR PRODUCING COMPACT DISK AND MINIDISK MASTER DISKS

[75] Inventor: Kenichi Amano, Kanagawa, Japan

[73] Assignee: Sony Corporation, Tokyo, Japan

[21] Appl. No.: 84,807

[22] Filed: Jun. 29, 1993

[30] Foreign Application Priority Data

Jun. 29, 1992 [JP] Japan ................................ 4-171212

[51] Int. Cl.[6] .................................................. G11B 17/22
[52] U.S. Cl. ............................... 369/32; 369/84; 360/15
[58] Field of Search ............................ 369/32, 83, 84, 369/30, 85, 59, 60; 360/15, 32, 8

[56] References Cited

U.S. PATENT DOCUMENTS

| | | | |
|---|---|---|---|
| 4,410,917 | 10/1983 | Newdoll et al. | 369/84 X |
| 4,811,325 | 3/1989 | Sharples, Jr. et al. | 369/85 |

FOREIGN PATENT DOCUMENTS

| | | |
|---|---|---|
| 0234709A9 | 9/1987 | European Pat. Off. . |
| 0415289A3 | 3/1991 | European Pat. Off. . |
| 0421871A3 | 4/1991 | European Pat. Off. . |
| 2054445 | 2/1990 | Japan . |
| 2310835 | 12/1990 | Japan . |

*Primary Examiner*—Ali Neyzari
*Attorney, Agent, or Firm*—Limbach & Limbach; W. Patrick Bengtsson

[57] ABSTRACT

A mastering apparatus which can produce both a format signal for a compact disk and another format signal for a minidisk. Most of the components of a mastering processing system for a compact disk are common to a mastering processing system for a minidisk. An address generator for generating an address upon mastering processing for a minidisk is provided. The operation condition of the address generator is controlled by controlling a digital signal processor of the address generator. When a compact disk format signal is to be produced, the address generator is controlled to a no-operation mode so that the apparatus operates as a compact disk mastering apparatus. On the other hand when a minidisk format signal is to be produced, the address generator is controlled to an operation mode so that the apparatus operates as a minidisk mastering apparatus.

5 Claims, 6 Drawing Sheets

MASTERING APPARATUS FOR PRODUCING COMPACT DISK AND MINIDISK MASTER DISKS

BACKGROUND OF THE INVENTION

1. Field of the Invention

This invention relates to a mastering apparatus suitably applied for production of master disks for a compact disk and a minidisk.

2. Description of the Related Art

A so-called minidisk (optical disk) (MD) for reproducing or recording and reproducing an audio signal has been developed. The minidisk has a smaller diameter than the diameter of a compact disk (CD) which can reproduce an audio signal without deterioration of the sound quality.

While the minidisk has a very small diameter of 64 mm, it requires the same recording time as the compact disk by making use of a special signal compression processing technique. The signal format of the minidisk is approximately the same as the CD-ROM mode 2.

When a master disk for a compact disk is to be manufactured, a compact disk master tape is first produced in a studio. A compact disk format signal is then produced, based on the compact disk master tape, using a compact disk mastering apparatus installed in a compact disk producing factory. The compact disk format signal is sent to a disk cutting apparatus, by which a master tape for a compact disk is produced.

When a master disk for a minidisk is to be produced, similar, but separate, equipment as that used to make a master disk for a compact disk is used. Consequently, a mastering apparatus for production of a master disk for a compact disk and another mastering apparatus for production of a master disk for a minidisk must be provided separately in a disk producing factory.

However, since the signal format used to make a minidisk is approximately the same as that used to make a CD-ROM (compact disk read only memory) as described above, most of the component elements of a compact disk mastering apparatus in a studio and a compact disk mastering apparatus in a factory can be utilized as component elements for production of a minidisk. If the mastering apparatus for a compact disk and a minidisk can be constructed as a single apparatus, then the compact disk producing factory can also be utilized as a minidisk producing factory, and consequently, investment in a new plant and new equipment can be saved. Additionally, discovery of a piracy, discovery of production of a minidisk without obtaining a right of authorship will be facilitated.

SUMMARY OF THE INVENTION

It is an object of the present invention to provide a mastering apparatus which can be used for production of both a compact disk and a minidisk.

It is another object of the present invention to provide a mastering process which allows a compact disk or a minidisk to definitely present its origin of production.

In order to attain the objects described above, according to an aspect of the present invention, there is provided a mastering apparatus, which comprises a first mastering processing system for producing a compact disk, a second mastering processing system for producing a minidisk, most of the components of said first mastering processing system being used commonly for said second mastering processing system, an address generator for generating an address when said second mastering processing system operates, said address generator including a digital signal processor, and control means for controlling said digital signal processor of said address generator to control the operation condition of said address generator. Preferably, the mastering apparatus further comprises means for down-loading a program for said digital signal processor to realize a no-operation mode of said address generator.

According to another aspect of the present invention, there is provided a mastering apparatus, which comprises a first mastering processing system for producing a compact disk, a second mastering processing system for producing a minidisk, most of components of said first mastering processing system being used commonly for said second mastering processing system, an address generator for generating an address when said second mastering processing system operates, said address generator including a digital signal processor, and means for adding identification information peculiar to said address generator to recording data to be recorded onto a disk without having any influence upon the recording data.

According to a further aspect of the present invention, there is provided a mastering apparatus, which comprises a first mastering processing system for producing a compact disk, a second mastering processing system for producing a minidisk, most of components of said first mastering processing system being used commonly for said second mastering processing system, an address generator for generating an address when said second mastering processing system operates, said address generator including a digital signal processor, and means for adjusting, upon production of recording data for a minidisk, the phases of a Q subcode for a compact disk and audio main data to match each other.

According to a further aspect of the present invention, there is provided a process of producing master data of a signal for a minidisk, comprising the steps of reproducing master data for a compact disk, separating the reproduced master data into digital audio data and identification data, forming a data stream of a signal for a minidisk from the digital audio data and the identification data, and recording the data stream of the signal for a minidisk. The step of forming a data stream of a signal for a minidisk may include the steps of coding the digital audio data by adaptive transform acoustic coding and adding a subcode included in the identification data to the coded digital audio data.

According to yet a further aspect of the present invention, there is provided a process of producing master data of a signal for a minidisk, comprising the steps of reproducing master data for a compact disk, separating the reproduced master data into digital audio data and identification data, forming a data stream of a signal for a minidisk from the digital audio data and the identification data, recording the data stream of the signal for a minidisk, reproducing the recorded data stream of the signal for a minidisk, separating the reproduced data stream of the signal for a minidisk into the digital audio data and the identification data, making the time axis of the separated identification data coincide with the time axis of the digital audio data, generating an identification code peculiar to the producing apparatus, generating a composite signal using the identification data, whose time axis has been made to coincide with the time axis of the reproduced digital audio data, and the identification code, and modulating a laser beam in response to the composite signal to record the composite signal onto a disk recording medium.

The address generator, which is used when a format signal for a minidisk is to be produced, includes a digital signal generator, and the address processor is controlled to an operation condition or a no-operation condition in accordance with contents of a program down-loaded into the digital signal processor.

Accordingly, when the mastering apparatus is made to operate as an apparatus for the production of a compact disk, use of the address generator is not necessary, and a program which puts the address generator into the no-operation condition is down-loaded into the digital signal processor.

On the other hand, when the mastering apparatus is made to operate as an apparatus for the production of a minidisk, another program which puts the address generator into the operation condition is down-loaded into the digital signal processor. Consequently, the mastering apparatus can be used as an apparatus for production of a compact disk as well as an apparatus for production of a minidisk.

Therefore, if a processing system for a minidisk is added to an existing mastering apparatus for a compact disk making use of most of the existing component elements, then the mastering apparatus for a compact disk can also be utilized as a mastering apparatus for a minidisk.

Further, the mastering apparatus and the master data producing processes of the present invention can achieve simplification of a master disk producing apparatus. Further, since change-over of the mastering apparatus between production of a compact disk and production of a minidisk is performed only by selective down-loading of a processing program, it can be achieved by mere processing of the software. Accordingly, also a control system for the change-over is very simple.

In addition, since an identification code such as a production number can be inserted into the format signal, confirmation of the origin of the master disk can be performed very readily.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

First, a process of producing a master tape for a minidisk will be described for the convenience of description.

Figure 5:
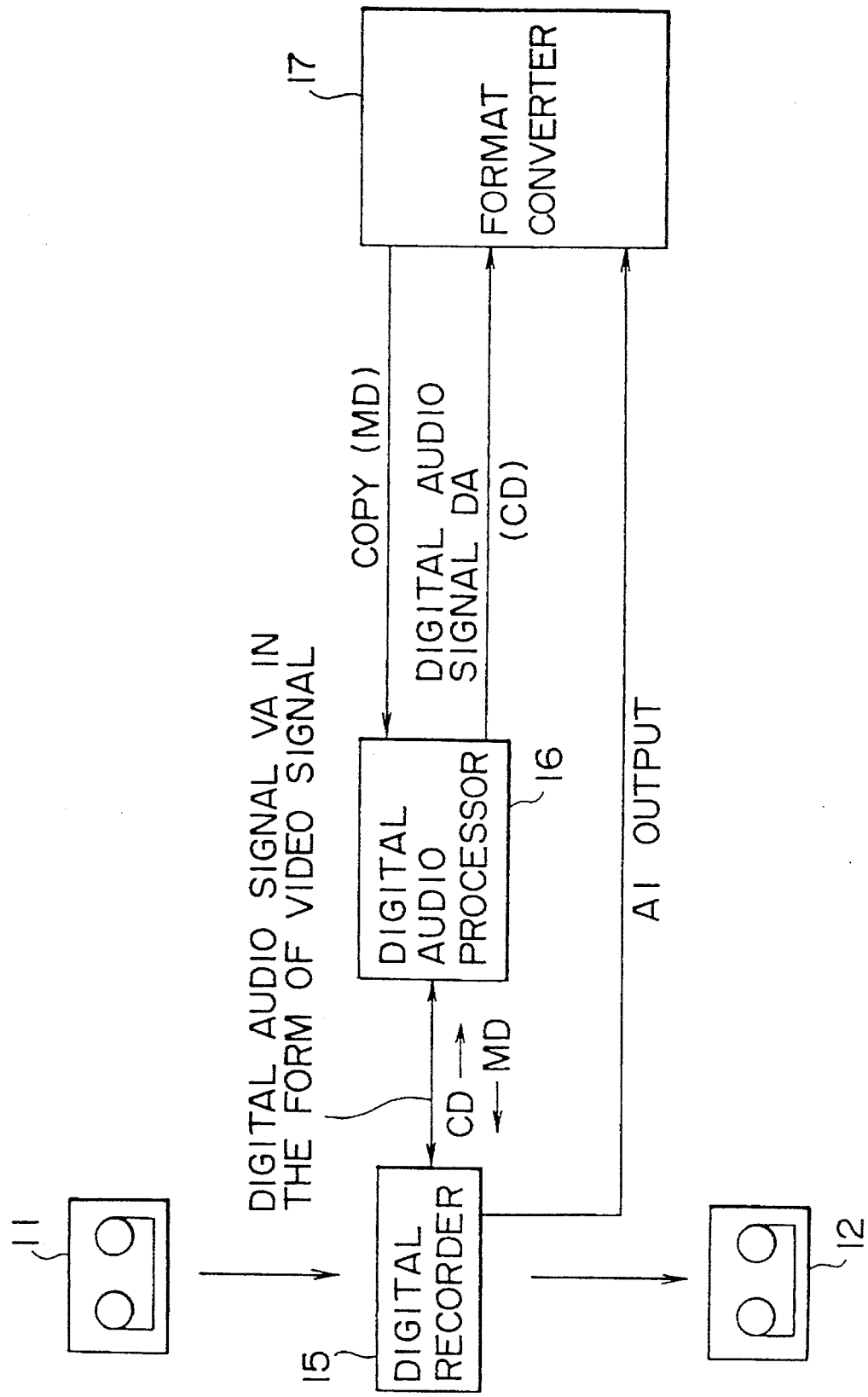
FIG. 5 is a block diagram showing a master tape producing apparatus in a studio.

Referring to FIG. 5, there is illustratively shown a mastering apparatus for use in a studio. The mastering apparatus is generally denoted at 10 and produces a master tape cassette 12 for a minidisk from a master tape cassette 11 for a compact disk. Since the band used for a digital audio signal extends up to 20 KHz, when master data for a compact disk are to be produced, they are normally produced using a video tape recorder. Since a video tape recorder is used, master data for a compact disk are recorded onto a video tape cassette 11.

Figure 6:
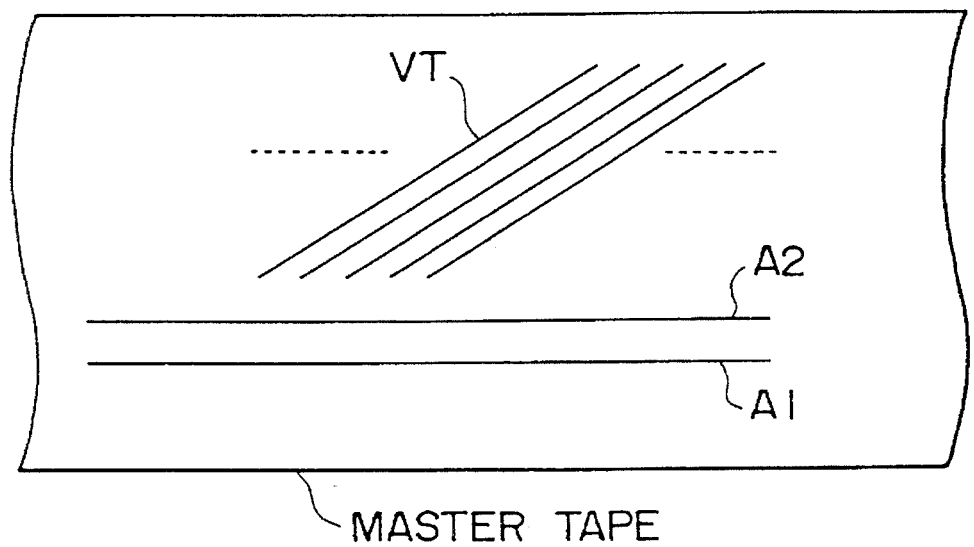
FIG. 6 is a diagrammatic view illustrating a tape format.

In this instance, a digital audio signal is recorded, in place of a video signal, onto helical video tracks VT of a video tape or master tape while maintaining its signal form (refer to FIG. 7) of a video signal as seen in FIG. 6. Table of contents (TOC) information and so forth are recorded onto an audio track A1 shown in FIG. 6, and time code information TC is recorded onto another audio track A2 of the master tape.

Referring back to FIG. 5, master data for a minidisk are produced using the master data for a compact disk. Also the master data for a minidisk are recorded onto the video tape cassette 12.

The master tape cassette 11 for a compact disk is loaded into a video tape recorder or digital recorder 15, wherein reproduction of data is performed. An audio signal VA reproduced from the video tracks VT is supplied to a digital audio processor 16, wherein it is converted into a digital audio signal which does not include a synchronizing signal or the like.

The digital audio data DA are supplied to a format converter 17. Since the format converter 17 is a processing apparatus for converting a format for a compact disk to another format for a minidisk, subcodes (TOC information and so forth) A1, which are one of two reproduction outputs, audio tracks A1 and A2 reproduced by the digital recorder 15 are supplied to the format converter 17.

The digital audio data DA undergo special audio data compression processing (ATRAC, or Adaptive Transform Acoustic Coding) in the format converter 17 so that after the audio data is compressed, the subcodes are mixed or composed with the compressed audio data.

Figure 7:
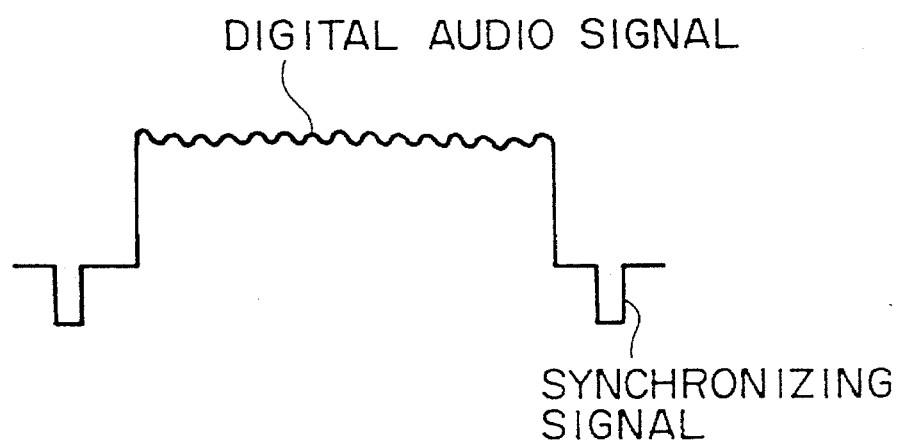
FIG. 7 is a waveform diagram showing a waveform of a video signal.

After the composition processing, the digital audio data DA are supplied to the digital audio processor 16 again so that they are converted into an audio signal (actually constituted only from audio data) having such a signal form as illustrated in FIG. 7. After such conversion, the audio signal is supplied to the digital recorder 15 and recorded onto a video tape in a manner similar to recording a master tape for a compact disk. However, in the case a master tape for a minidisk, only time code information is recorded onto the audio tracks. A video tape cassette produced in such a manner as described above is used as the master tape cassette 12 for a minidisk.

The compact disk master tape cassette 11 or the minidisk master tape cassette 12 produced in the studio is applied to a mastering apparatus installed in a disk producing factory so that a compact disk format signal or a minidisk format signal necessary for cutting a master disk is produced there.

Figure 1:
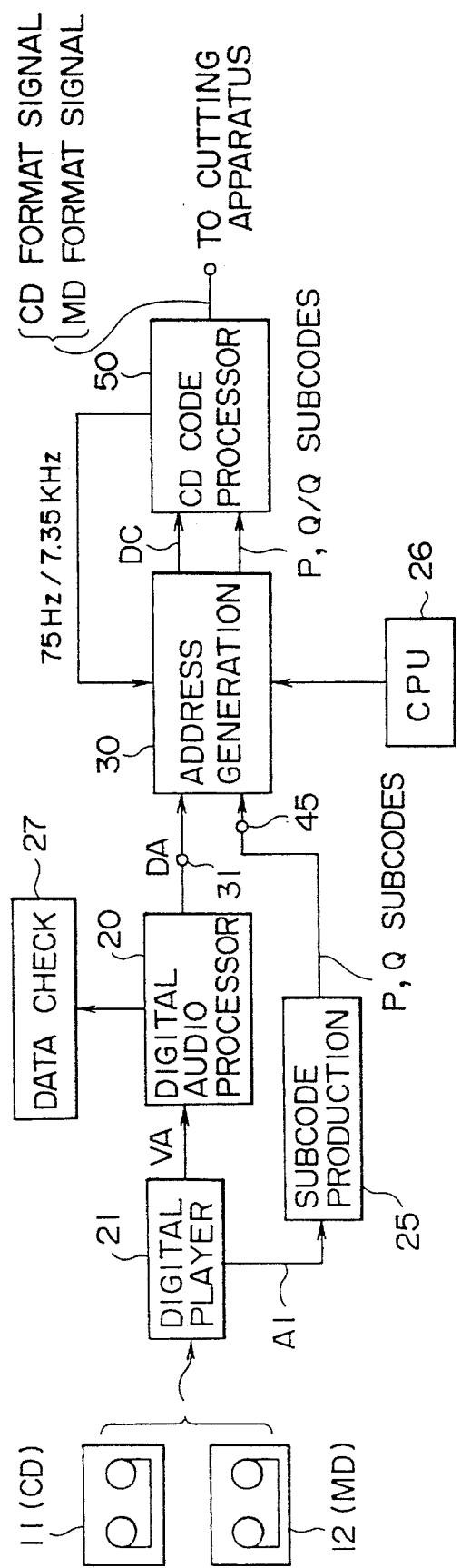
FIG. 1 is a block diagram of a mastering apparatus in a factory showing a preferred embodiment of the present invention.

FIG. 1 shows a mastering apparatus installed in a manufacturing factory to which the present invention is applied. The mastering apparatus is generally denoted at 20 and is constructed such that most components of a compact disk mastering apparatus installed already in the factory can be used as they are as components of a minidisk mastering apparatus.

The mastering apparatus 20 includes a digital player or video tape recorder 21 by which an audio signal for a cassette 11 for a compact disk or another cassette 12 for a minidisk is reproduced. An audio signal VA reproduced from the video tracks VT of the master tape is supplied to a PCM (pulse code modulation) digital audio processor 22, in which it is converted into data which only include a digital audio signal described above.

The mastering apparatus 20 further includes a subcode production circuit 25 which receives subcode information (TOC information and so forth) reproduced from the audio track A1 of the master tape and produces, from the subcode information, P and Q subcodes defined as a compact disk format signal. The P subcode is pause data, and the Q subcode is time information (hour, minute, second, frame). Accordingly, the subcode production circuit 25 is a processing block which is used only when a compact disk format signal is to be produced.

A digital audio signal DA output from the digital audio processor 22 and P and Q subcode data output, when necessary, from the subcode production circuit 25 are supplied to an address generator 30.

The address generator 30 is a processing block which is used only when a minidisk format signal is to be produced as hereinafter described. Thus, when a compact disk format signal is to be produced, a digital audio signal DA supplied to an input terminal 31 of the address generator 30 and P or Q subcode data supplied to another input terminal 45 of the address generator 30 are output from the address generator 30 without being processed.

This is because the compact disk format signal and the minidisk format signal each have different data construction. When producing a minidisk format signal, subcode information (cluster sector data), which is absolute address information included in the digital audio signal DA supplied to the terminal 31 of the address generator 30, is separated from the digital audio signal DA. The separated subcode information is then converted into a Q subcode and output.

Accordingly, when viewed at the output terminal of the address generator 30, both digital audio data DC and subcode data are output upon either the formation of a compact disk format signal or the formation of a minidisk format signal.

A compact disk code processor 50 performs processing of the re-arrangement of data along a compact disk format or a minidisk format and outputs a final compact disk format signal or minidisk format signal.

A system controller 26 is built into the address generator 30 and controls the address generator 30 so that it is automatically put into an operation mode when producing of a minidisk format signal or into a nonoperation mode when producing of a compact disk format signal.

As apparent from the construction described above, the mastering apparatus 20 can be made to operate as a compact disk mastering apparatus by putting the address generator 30 into the no-operation mode, or it can be made to operate as a minidisk mastering apparatus by putting the address generator 30 into the operation mode.

Figure 2:
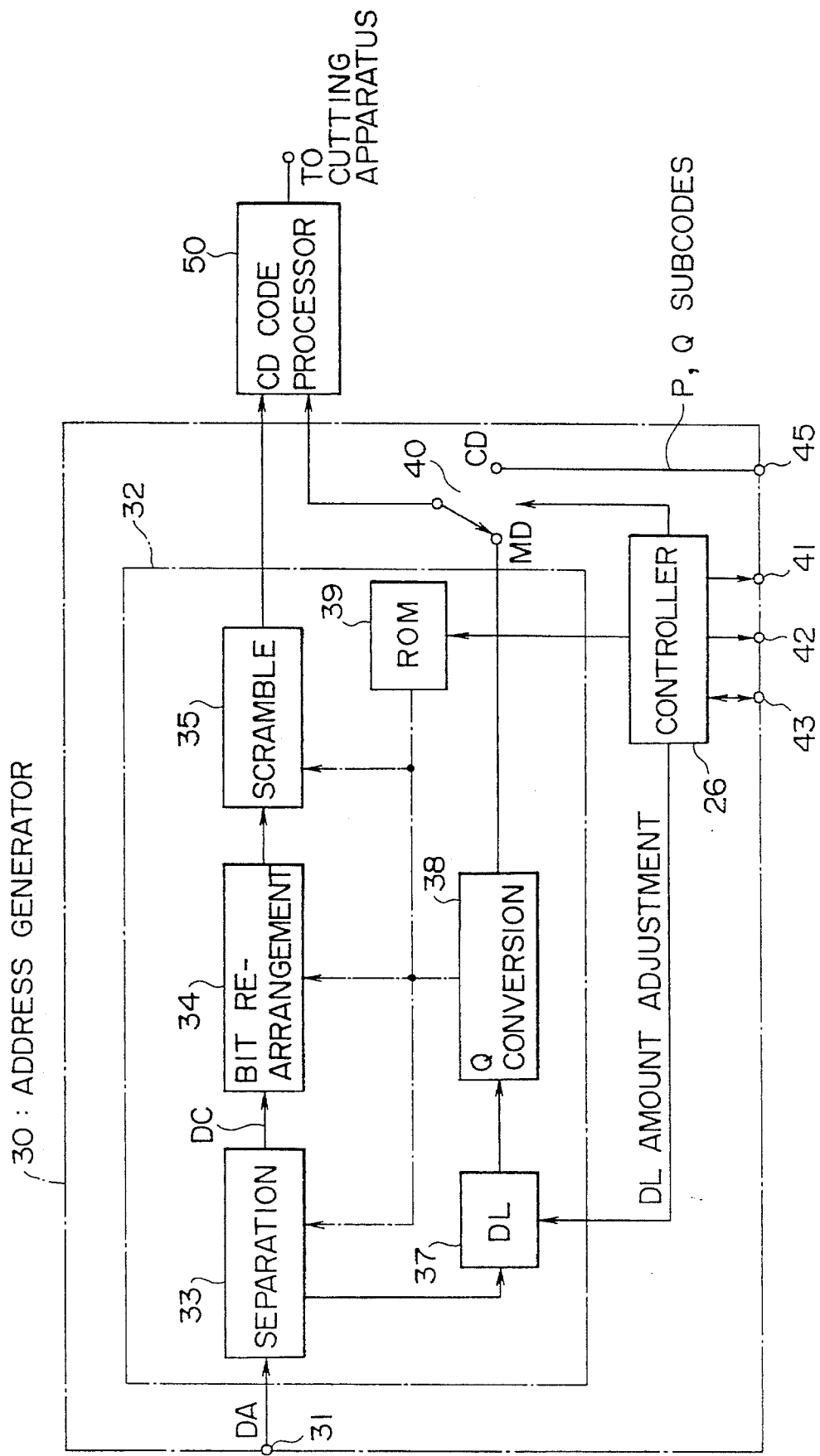
FIG. 2 is a block diagram showing details of an address generator of the mastering apparatus shown in FIG. 1.

A detailed construction of the address generator 30 is shown in FIG. 2.

Referring to FIG. 2, the address generator 30 has an input terminal 31 for a digital audio signal DA and includes a processing board 32 connected to the input terminal 31 for separating an input digital audio signal DA into digital audio data DC and subcode information and processing them.

The digital audio signal DA is first supplied to a signal separation circuit 33, by which it is separated into digital audio data DC and subcode information. The digital audio data DC are supplied to a bit re-arrangement processing circuit 34, by which re-arrangement of bits is performed so that gaps of bits caused by the separation of subcode information may be eliminated. The digital audio data DC after such bit re-arrangement are input to a scramble processing circuit 35.

Since data construction for a minidisk format signal approximately the same as data construction for CD-ROM mode 2, scramble processing conforming to a CD-ROM must necessarily be performed. While known CIRC processing is performed as error correction processing for a compact disk format signal, scramble processing peculiar to a CD-ROM is performed for a minidisk format signal in order to further suppress the error rate lower than the CIRC processing.

When it is necessary to apply signal processing peculiar to a minidisk to a minidisk format signal, and if such signal processing can be performed after scramble processing, a processing circuit used exclusively for signal processing may be provided at the stage after the scramble processing circuit 35.

Subcode information separated by the separation circuit 33 is supplied to a code conversion processing circuit 38 by way of a predetermined delay circuit 37. The delay circuit 37 is used to adjust the phase of a Q subcode, which will be hereinafter described, to a block synchronizing signal (75 Hz) supplied thereto from the outside, a delay circuit of the variable delay type being used as the delay circuit 37.

Figure 3:
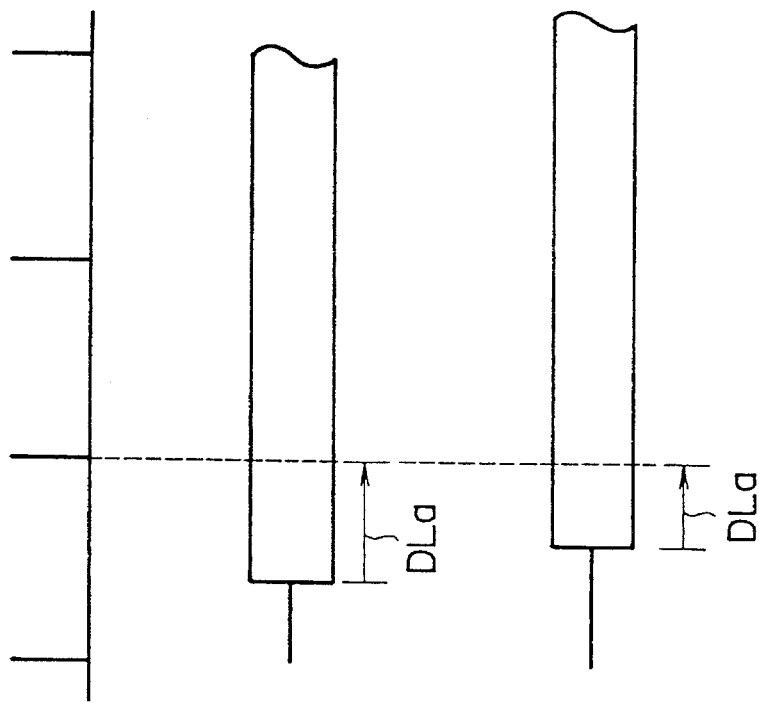
FIG. 3 is a waveform diagram illustrating delay amount adjustment of the mastering apparatus of FIG. 1.

Since digital audio data DC are processed in a synchronized relationship with a block synchronizing signal (clock signal of 75 Hz) supplied to the address generator 30 or a frame synchronizing signal (7.35 KHz), the digital audio data and the Q subcode output from the processing board 32 must necessarily be kept in phase with an external synchronizing signal. In this instance, since the digital audio signal DA input to the terminal 31 and the block synchronizing signal have a mutually asynchronous relationship, it would be indeterminate at what timing a Q subcode is output with respect to a block synchronizing signal as seen from FIG. 3.

Therefore, upon rising of the power, the displacement DLa of the digital audio signal DA from the block synchronizing signal is measured by means of the system controller 26, and the delay time of the delay circuit 37 is set in response to the displacement DLa. Consequently, the phases of the block synchronizing signal and the Q subcode can be adjusted to match each other.

Referring back to FIG. 2, the code conversion processing circuit 38 performs an operation of converting sub de information indicative of an absolute address into time information (Q sub de) including the hour, minute, second and frame. Then, the Q subcode data after such conversion and the digital audio data after such scramble processing as described above are output from the processing board 32.

The signal processing circuits 33, 34, 35 and 38 carried on the processing board 32 each possess a digital processor (DSP). Accordingly, predetermined processing programs in accordance with format processing operations are downloaded into the individual processing circuits 33, 34, 35 and 38 from a program ROM 39.

More particularly, when a compact disk format signal is to be produced, such programs as put the address generator 30 into the no-operation mode are down-loaded so that a digital audio signal DA is output without being altered by the processing board 32, but when a minidisk format signal is to be formed, such programs as put the address generator 30 into the operation mode are down-loaded so that such processing as described above is performed.

what processing programs are to be selected depends upon an instruction from the system controller 26. A switch control signal is output from the system controller 26, controlling a switch 40 such that, when a compact disk format signal is to be produced, P or Q subcode data supplied to a terminal 45 of the address generator 30 is output, but when a minidisk format signal is to be produced, Q subcode data output from the processing board 32 is output from the address generator 30.

A plurality of external appliance terminals are provided for the system controller 26; a printer is connected to the terminal 41; a monitor display is connected to the terminal 42; and a keyboard is connected to the terminal 43.

Digital audio data DC and subcode data output from the address generator 30 are supplied to the compact disk code processor 50. The processor 50 is constructed in such a manner as shown in FIG. 4.

Figure 4:
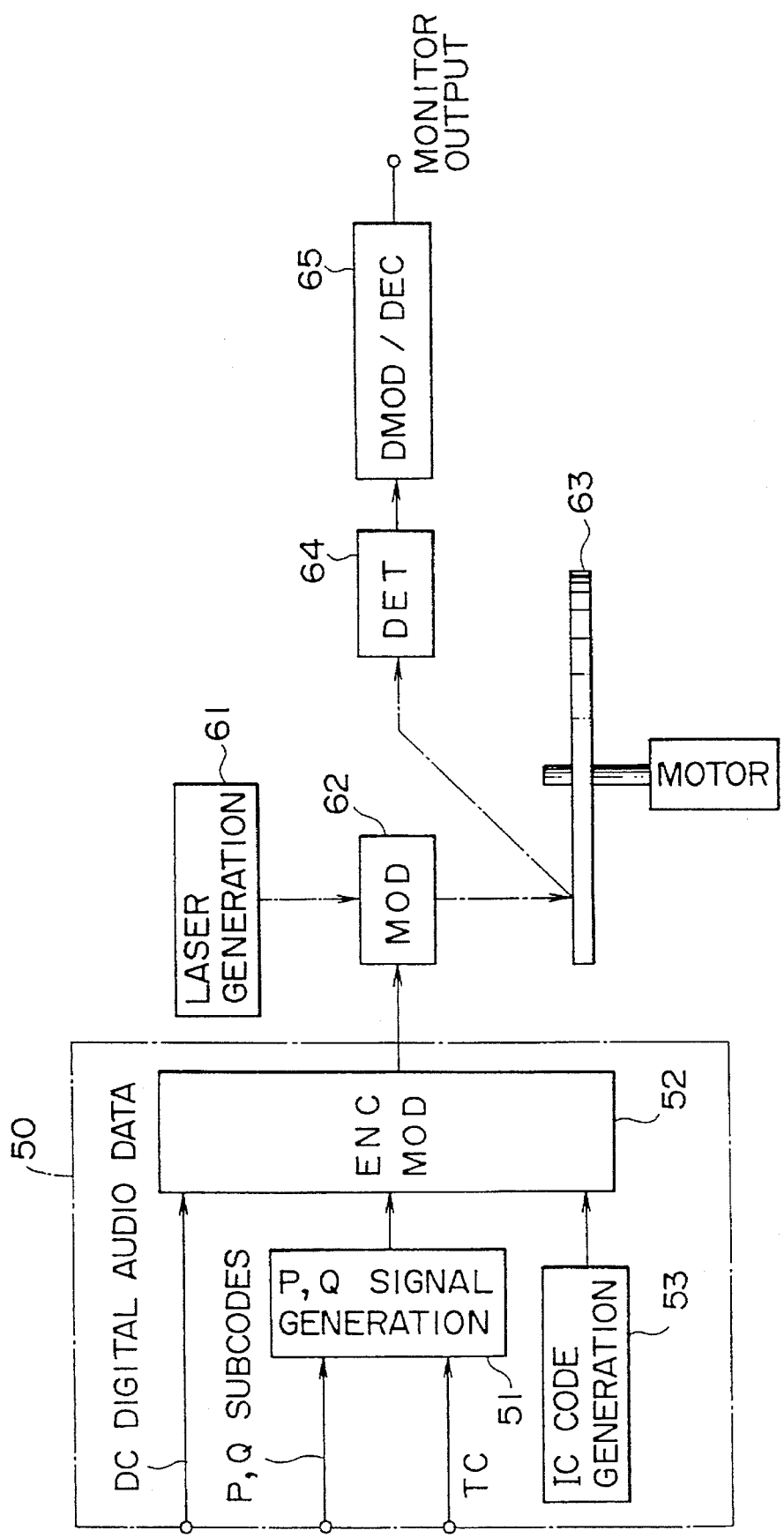
FIG. 4 is a block diagram showing details of a cutting apparatus connected to the mastering apparatus of FIG. 1.

Referring to FIG. 4, the processor 50 includes a P, Q signal generation circuit 51 which performs rearrangement of P and Q subcode data or Q subcode data input thereto to data arranged in a particular format. Thereafter, the data are supplied together with digital audio data DC to an encoder 52, in which a compact disk format signal or a minidisk format signal is produced.

At this stage, information can be added to the compact disk format signal or the minidisk format signal. In particular, an identification code generation circuit 53 stores an identification number peculiar to an address generator employed or another identification number peculiar to a disk cutting apparatus described below as identification data ID. The identification data ID is then added to the digital audio data in such a manner that there is no influence on the digital audio data or any other control data.

The identification data ID may be an apparatus production number, a number for identification of a producing factory, or a serial number of a disk maker.

The encoder 52 thus performs known CIRC processing or EFM processing and then produces a compact disk format signal or a minidisk format signal in accordance with the required format.

FIG. 4 further shows a cutting apparatus 60. The cutting apparatus 60 includes a laser generation apparatus 61, from which a laser beam is emitted and supplied to an optical modulator 62. A compact disk format signal or a minidisk format signal described above is supplied as a modulating signal to the optical modulator 62 so that the laser beam is optically modulated in response to the format signal. Thus, pits are embossed in accordance with the modulation of the laser beam on an optical disk 63 thereby forming a master disk. Since the optical disk 63 may be either compact disk or a minidisk, a master disk for a compact disk and another master disk for a minidisk can be produced from the cutting apparatus 60.

Part of the laser beam irradiated upon the optical disk 63 is supplied to a detector 64, whose output is decoded by a decoder 65 in order to monitor the data during cutting.

The identification code ID described above can be inserted not only into the encoder 52, but also into the optical modulator 62 itself or an output system of the optical modulator 62.

Having now fully described the invention, it will be apparent to one of ordinary skill in the art that many changes and modifications can be made thereto without departing from the spirit and scope of the invention as set forth herein.

What is claimed is:

1. A mastering apparatus, comprising:

a first mastering processing system for producing a compact disk;

a second mastering processing system for producing a minidisk, most of the components of said first mastering processing system being used in said second mastering processing system;

an address generator for generating an address when said second mastering processing system operates, said address generator including a digital signal processor;

control means for controlling said digital signal processor of said address generator to control the operation condition of said address generator; and means for down-loading a program for said digital signal processor to realize a no-operation mode of said address generator.

2. A mastering apparatus, comprising:

a first mastering processing system for producing a compact disk;

a second mastering processing system for producing a minidisk, most of the components of said first mastering processing system being used in said second mastering processing system;

an address generator for generating an address when said second mastering processing system operates, said address generator including a digital signal processor; and means for adding identification information peculiar to said address generator to recording data to be recorded onto a disk without having any influence upon the recording data.

3. A mastering apparatus, comprising:

a first mastering processing system for producing a compact disk;

a second mastering processing system for producing a minidisk, most of the components of said first mastering processing system being used in said second mastering processing system;

an address generator for generating an address when said second mastering processing system operates, said address generator including a digital signal processor; and means for adjusting, upon production of recording data for a minidisk, the phases of a Q subcode for a compact disk and audio main data to match each other.

4. A process of producing master data of a signal for a minidisk, comprising the steps of:

reproducing master data for a compact disk;

separating the reproduced master data into digital audio data and identification data;

forming a data stream of a signal for a minidisk from the digital audio data and the identification data;

recording the thus formed data stream of the signal for a minidisk;

wherein the step of forming a data stream of a signal for a minidisk includes the steps of coding the digital audio data by adaptive transform acoustic coding and adding a subcode included in the identification data to the coded digital audio data.

5. A process of producing master data of a signal for a minidisk, comprising the steps of:

reproducing master data for a compact disk;

separating the reproduced master data into digital audio data and identification data;

forming a data stream of a signal for a minidisk from the digital audio data and the identification data;

recording the thus formed data stream of the signal for a minidisk;

reproducing the recorded data stream of the signal for a minidisk;

separating the reproduced data stream of the signal for a minidisk into the digital audio data and the identification data;

making the time axis of the separated identification data coincide with the time axis of the digital audio data;

generating an identification code peculiar to the producing apparatus;

composing the identification data, whose time axis has been made coincide with the time axis of the reproduced digital audio data, and the identification code to generate a composite signal; and modulating a laser beam in response to the composite signal to record the composite signal onto a disk recording medium.

* * * * *